(No Model.) 2 Sheets—Sheet 1.
J. W. ROGERS.
COMBINED DRILL, SEEDER, AND CULTIVATOR.
No. 431,919. Patented July 8, 1890.
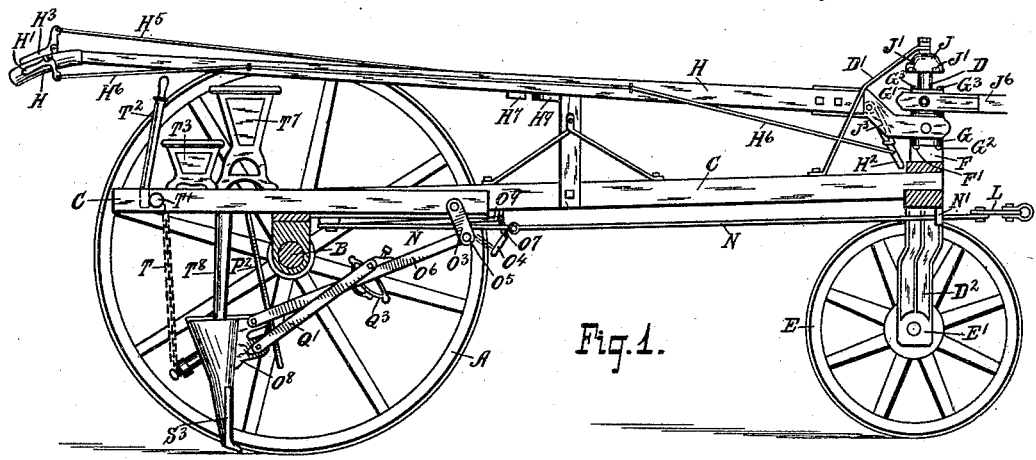
Fig. 1.
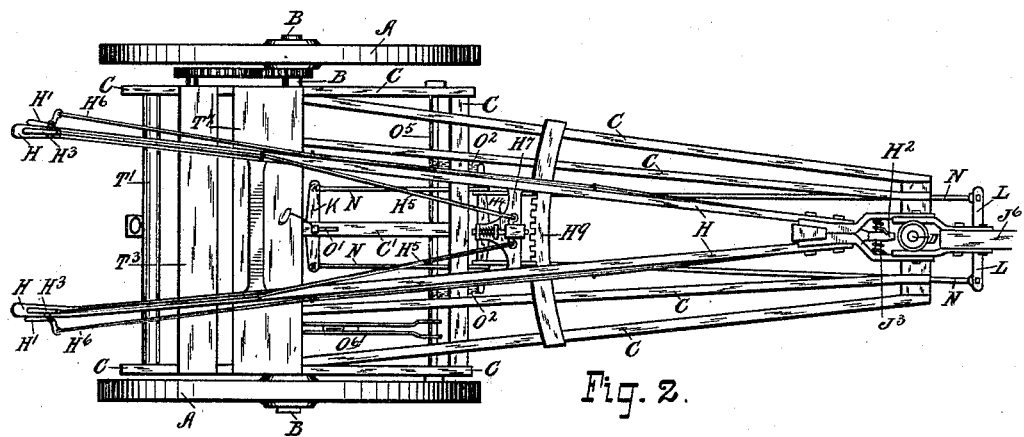
Fig. 2.
Fig. 3.
Attest
W. Edmunds
Jas. E. Edmunds
Inventor
James W. Rogers
By P. J. Edmunds
Atty (No Model.) 2 Sheets—Sheet 2.

J. W. ROGERS.
COMBINED DRILL, SEEDER, AND CULTIVATOR.

No. 431,919. Patented July 8, 1890.

Attest
A. Edmunds
Jas. E. Edmunds

Inventor
James W. Rogers,
By P. J. Edmunds
Atty

UNITED STATES PATENT OFFICE.

JAMES W. ROGERS, OF KINGSMILL, ONTARIO, CANADA.

COMBINED DRILL, SEEDER, AND CULTIVATOR.

SPECIFICATION forming part of Letters Patent No. 431,919, dated July 8, 1890.

Application filed February 28, 1890. Serial No. 342,165. (No model.) Patented in Canada September 7, 1885, No. 22,414.

*To all whom it may concern:*

Be it known that I, JAMES WILBERT ROGERS, a subject of the Queen of Great Britain, and a resident of Kingsmill, in the county of Elgin, in the Province of Ontario, Canada, have invented certain new and useful Improvements in Combined Drills, Seeders, and Grain-Cultivators, (for which Canadian patent was granted to me September 7, 1885, No. 22,414,) of which the following is a specification.

This invention relates to improvements on a machine for sowing seed broadcast or sowing grain by drilling it in rows, and a machine in which the drill-teeth may be detached and cultivator-teeth secured in their place, so that the same machine can be used for a grain-cultivator to stir the soil and destroy weeds, as well as for a grain-drill; and these improvements consist of a guiding-wheel controlled and held in position by suitable mechanism, whereby the machine, whether used as a grain-drill or grain-cultivator, is guided in the required course to sow or cultivate the grain; and also of the combination of draw-bars connected together by rods, to which the horses are hitched, so that the horses in drawing the machine, when sowing or cultivating grain, will have no influence to turn the machine from its course when directed by the operator, and these draw-bars and rods, in combination with other draw-bars and rods and slotted bar, are for automatically changing the draft and wear from the teeth to the frame of the machine, and vice versa, when required; and also of an improved spring-holder, to which either the drill or cultivator teeth may be secured, as required, which secures either the drill or cultivator teeth in position, at the same time allowing them to move back and free themselves from obstructions; and also of a guide-strip suspended from the machine for retaining the teeth of either a grain-drill or grain-cultivator the same relative distance apart when the machine is in operation.

The construction and operation will be more particularly explained with reference to the accompanying drawings, wherein—

Figure 4:
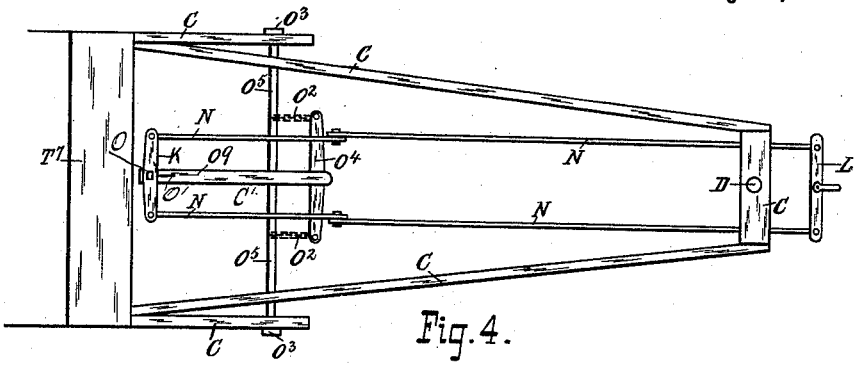
Figure 5:
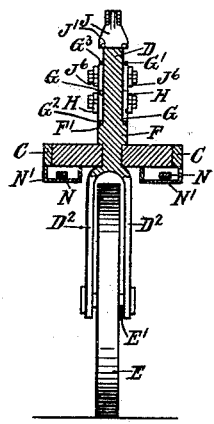
Figures 6, 10:
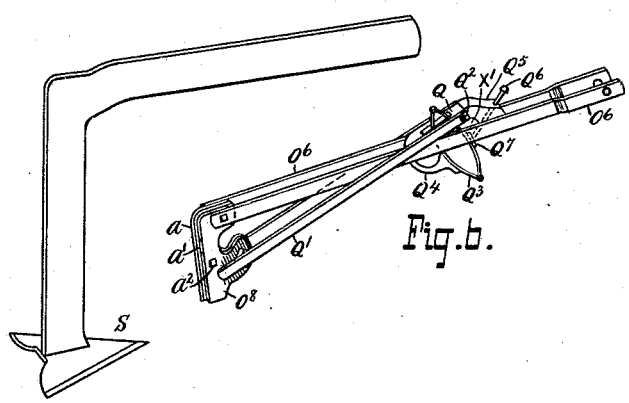
Figure 7:
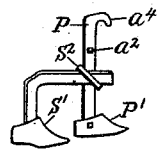
Figure 8:
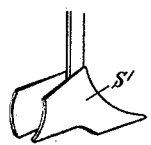
Figure 9:
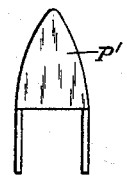

Figure 1 is a side elevation of a machine embodying my invention. In this view one of the rear side wheels is removed. Fig. 2 is a plan view of same. Fig. 3 is a detail plan view of the guiding-handles and attachments. Fig. 4 is a detail plan view of the draw-bars and connections. Fig. 5 is a detail front end view of the forked upright and guiding-wheel, partly in section. Fig. 6 is an enlarged detail perspective view of the spring-holder. Fig. 7 is an enlarged detail perspective view of the cultivator hilling-tooth, regulator, and upright. Fig. 8 is a detail perspective view of the cultivator hilling-tooth. Fig. 9 is a detail view of the bottom of the regulator. Fig. 10 is an enlarged detail perspective view of the cultivator cutting-tooth to be used for cutting and destroying weeds.

A designates the main wheels, revolving on the axle B, and C is the frame of the machine, connecting the axle B to the upright D, the lower end of which upright D is forked. The front end of this frame C is secured to the upright D, and is held in place between the shoulders formed by the prongs $D^2$ and the flange or collar F. This flange F is provided with mortises F', and the collar G is provided with studs $G^2$, which fit snug in said mortises F', when required.

E is a guiding-wheel revolving on shaft E', the latter being supported in bearings in the prongs $D^2$ of the upright D.

H H are handles resting on the cog-segment $H^9$, by which the operator is enabled to guide the machine, and these handles are pivotally connected to the collar G, and the latter encircles the upright D.

G' is another collar encircling the upright D, to which collar G' the tongue $J^6$ is pivotally connected.

$G^3$ $G^3$ are studs projecting up from the collar G', which studs fit snug into mortises J' in the cap J, when required. This cap J is rigidly secured to the upright D, and the upper end of the latter is braced and held in a rigid upright position by the braces D', bracing the upper end of the upright D to the frame C.

$H^2$ is a dog pivotal on the handles H, which dog $H^2$ is drawn toward the upright D by the spring $J^3$.

H' H' are levers pivoted on the handles H H, which levers are connected to the dog $H^2$ by the wire rods $H^6$.

$H^4$ is a spring-bolt, which is held in place by and works back and forth in a socket in the brace $H^7$, which brace $H^7$ connects the handles H H. This spring-bolt $H^4$ is drawn back from between the cogs of the cog-segment $H^9$ by the levers $H^3$, pivoted on the handles H H, the levers $H^3$ being connected with the bolt $H^4$ by the wire rods $H^5$.

$C'$ is part of the frame of the machine, formed of iron or other suitable material, in which an elongated slot $O'$ is formed. Pivotally secured to this bar $C'$ by a bolt O, passing through slot $O'$, is a draw-bar K. The head of bolt O prevents it from falling through said slot $O'$. This secures and retains said draw-bar K underneath the part $C'$ of the frame of the machine, and this slot $O'$ permits the bolt O and draw-bar K to move slightly lengthwise of the machine, if required. The draw-bar K is connected to the draw-bar L by the jointed rods N N.

L is the draw-bar, to which the horses are hitched, and these rods N N' are retained in a horizontal position at their front ends by the hangers or stirrups N' N, suspended from the frame C. These hangers N', which support the front ends of the rods N N, are of a sufficient width to allow the rods N N to move perfectly free from side to side, and the collar $G'$, to which the tongue $J^6$ is pivotally connected, also turns perfectly free on the upright D, except when the studs $G^3$ engage with the mortises $J'$ of the cap J, so that if the horses hitched to the draw-bar L should sway from side to side while drawing the machine they would have no influence to turn the machine from its course when directed by the operator.

$O^9$ is a bar situated below the part $C'$ of the frame, and this bar $O^9$ is rigidly secured at the rear end to the draw-bar K, and this bar $O^9$ is supported in a horizontal position at the front end by a hanger suspended from the frame of the machine, and to this front end of the bar $O^9$ one end of a chain $O^7$ is secured, the other end of this chain being secured to the draw-bar $O^4$, and both ends of this draw-bar $O^4$ are secured to the shaft $O^5$ by chains $O^2$. This shaft $O^5$ is supported from the under side of the frame of the machine by pivotal arms $O^3$, and to this shaft $O^5$ the end of each of the draw-bars $O^6$ is pivotally secured. The construction and arrangement of these draw-bars and rods are for the purpose of automatically changing the wear and draft from the frame C of the machine to the teeth, or vice versa, because as soon as the teeth S S' or $S^3$ engage with the soil the draft and strain come directly on them through the rods N N, draw-bars K, and bar $O^9$, chain $O^7$, draw-bar $O^4$, chains $O^2$, and shaft $O^5$, with which they are in connection through the draw-bars $O^6$. There is no strain of the teeth drawing through the soil on the frame C of the machine as the draft comes on the bar $O^9$ from the draw-bar K, because when the teeth are engaging with the soil the bolt O is adjusted near the center of the slot $O'$ in the bar $C'$. When the drilling or cultivating is finished, the teeth are disengaged from and raised and held up clear from the soil. The draft and wear of drawing the machine then comes on the frame C direct from the rods N N and draw-bar K, so that when the machine is drilling or cultivating the wear and draft will be on the teeth, and when the machine is moving along the road or from one field to another the wear and draft will be on the frame C of the machine. The other or rear end of each pair of draw-bars $O^6$, as shown particularly in Fig. 6, are pivotally connected to the tooth-holder $O^8$. Q is a socket-arm pivotally secured at one end to the draw-bars $O^6$, the other end of this socket-arm Q being pivotally secured to one end of the braces $Q'$, the other rear end of braces $Q'$ being secured to the tooth-holder $O^8$. Projecting up through this socket-arm Q is the elliptic spring $Q^3$, which elliptic spring $Q^3$ is riveted to the bracket $Q^4$ of the socket-arm Q.

$Q^5$ is a block secured on the draw-bars $O^6$, through which a set-screw $Q^6$ passes. This set-screw $Q^6$ screws into an enlarged flange-piece $Q^7$, secured on the elliptic spring $Q^3$, by means of which the tension of the elliptic spring $Q^3$ is increased or diminished, according as the set-screw $Q^6$ compresses said elliptic spring.

Between the flanges $a\,a$ of the tooth-holder $O^8$ the flange $a'$ of the drill-tooth $S^3$ is inserted and rigidly secured therein by bolt $a^2$ and a hook similar to $a^4$. (Shown in Fig. 7.) By loosening the bolt $a^2$ and detaching the drill-tooth $S^3$ from the tooth-holder $O^8$ either of the cultivator-teeth S or S' may be rigidly secured between the flanges $a\,a$ of the tooth-holder by the bolt $a^2$ and hook $a^4$.

$P'$ is a regulator pivotally secured to the lower end of the upright P, and to this upright P may be secured either of the teeth S or S' by the clamp $S^2$.

S is a cutting-tooth for loosening up the soil and cutting the weeds.

S' is a hilling-tooth, the base of which at the point tapers outward, and as it passes through the soil loosens it up. The base of the tooth S' at the rear end tapers inward, and as it passes through the loose soil the latter is raised to cover over the roots of fall wheat when heaved or raised from the ground by the action of the frost. The upper front part of the regulator $P'$, in front of the upright P, tapers toward the top and front, so as to allow it to pass in between and raise the tops of the grain-plants to allow the tooth S' to cover their roots with soil without throwing the soil on the tops of the grain-plants. At the point and extending back and over the greater portion of the lower surface of the regulator $P'$ is a close bottom, which is tapered upward at the point, in order to allow it to ride perfectly free over the ground. Either of the teeth S or S' may be secured at any desired height on the upright P by the clamp $S^2$, thereby gaging the depth at which the teeth are required to enter the ground below the base of the regulator $P'$, and when the teeth are adjusted to enter the ground any required depth that depth is maintained throughout by the regulators P'.

P² are guide-strips extending down from the frame C or other part of the machine at equal distances apart and between each pair of draw-bars O⁶ to hold and retain the latter, as well as the teeth connected thereto, the same distance apart to prevent them from interfering when the machine is in operation.

T is a chain connecting an extension of one side of the draw-bars O⁶ to the shaft T', which shaft T' is revolved by the lever T², and as this shaft T' is revolved it winds the chain T around it and raises the teeth S or S' and regulators P' clear from the ground to travel from one field to another or along the road.

T³ is a seed-box of a grass-seed sower, secured to the frame C at the rear of the axle B, for sowing grass-seed when cultivating fall wheat. This seed-box T³ may be secured to the frame C in front of the axle B for sowing grass-seed when cultivating spring grain. This grass-seed sower T³ may be operated by a chain belt and wheels or other suitable device, and may be provided with a chute or deflector to deliver the seed well in front or at the rear of the cultivator-teeth, as required.

T⁷ is a grain-box of a grain drill-sower, from which the seed is taken by the tube T⁸ and delivered to the drill-tooth S³.

In guiding this combined drill, seeder, and grain-cultivator, when used either for sowing or cultivating grain, the operator grasps the handles H H at the rear of the machine and presses on the levers H³. This instantly withdraws the spring-bolt H⁴ from between the cogs of the cog-segment H⁹, which allows the handles H H to move perfectly free any distance required to either side, these handles H H at the front of the machine being connected to a collar G and the studs G² of the collar G being inserted in the mortises F' of the flange F of the upright D. As the operator moves the handles H H horizontally to either side the upright D, as well as the guiding-wheel E, is adjusted readily and easily to turn off at any angle to either side to guide the machine in the direction required, and very little power is required to be applied to the rear ends of the handles H H to adjust and set the guiding-wheel E, on account of the long leverage of the handles H H, and as soon as the guiding-wheel E is adjusted in the proper direction the levers H³ are released, when the spring-bolt H⁴ is projected between the cogs of the cog-segment H⁹. This firmly holds the handles at that point and prevents them from accidentally moving to either side, thereby preventing the guiding-wheel E from moving from its course, so that the guiding-wheel is set to travel in a direct line, which guides the rear wheels as well as the drill or cultivator teeth steadily, and in a direct course to sow the grain when drilling, or between the rows of the grain-plants when cultivating without bruising or injuring them, and after the machine has traveled in this direct course the length of the field and it is required to turn the machine around the rear ends of the handles H H are pressed downward, the cog-segment H⁹ forms a fulcrum for them, so that as the handles H H are depressed at the rear end, they are raised at the front end, and as the handles H H are raised at the front end the studs $a^2$ are withdrawn from the mortises F', and the front ends of the handles H H are farther raised until the studs G³ are inserted in the mortises J' in the cap J, when the dog H² is acted on by the spring J³ and drawn over on the shoulder, which firmly holds the handles H H in this position and allows the horses to turn the tongue J⁶, as well as the guiding-wheel E, to either side independent of the handles H H, in order to turn the machine around. As soon as the machine is turned around, the levers H' are compressed, which draws the dog H² off from the shoulder X, which allows the handles H H, with the collar G and studs G², to be lowered to their original position. The tension of the elliptic spring Q³ is sufficient under all ordinary circumstances to retain the drill or cultivator tooth up to its work; but should the tooth meet with an unusual obstruction the elliptic spring Q³ would allow the braces Q', to be drawn back, which would allow the tooth to turn up and free itself, which would raise the socket-arm Q over the elliptic spring Q³, and as soon as the tooth was free the elliptic spring Q³ would bring the braces Q' and socket-arm Q, as well as the tooth, back to their original position. This bolt Q², to which the braces Q' are secured, may be withdrawn from the socket-arm and inserted in the socket X', formed in the lower part of the block Q⁵ and socket-arm Q. This is necessary when using the cultivator-teeth, because, owing to their shape, they require to move farther back to free themselves from obstructions than the drill-tooth. The bolt Q² is secured in this cavity X' by the tension of the elliptic spring Q³ on the socket-arm Q. When the cultivator-tooth comes in contact with an unusual obstruction, the braces Q' compress the elliptic spring Q³ and allow the bolt Q² to escape from the cavity X' and move back on the draw-bars O⁶ until the tooth has been raised sufficiently to free itself from the obstruction, when the operator may readily return it to its original position.

Having thus described my invention, what I claim as new, and desire to secure by Letters Patent, is—

1. The forked upright D, guiding-wheel E, and shaft E'; in combination with the collar or flange F, formed with mortises F', collar G, formed with studs G², handles H H, and frame C, substantially as shown and described, and for the purpose specified.

2. The forked upright D, guiding-wheel E, and shaft E', in combination with collar G', formed with studs G³, tongue J⁶, cap J, formed with mortises J', shoulder or collar X, dog H², spring J³, handles H H, rods H⁶, and levers H′, substantially as shown and described, and for the purpose specified.

3. The combination of the forked upright D, collars G G′, provided with studs $G^2$ $G^3$, respectively, cap J, provided with mortises J′, flange F, provided with mortises F′, guiding-wheel E, shaft E′, tongue $J^6$, frame C, handles H H, levers H′ $H^3$, rods $H^5$ $H^6$, dog $H^2$, spring $J^3$, socketed brace $H^7$, cog-segment $H^9$, and spring-bolt $H^4$, substantially as shown and described, and for the purpose specified.

4. The bar C′, formed with slot O′, in combination with bolt O, draw-bars L, K, and $O^4$, bar $O^9$, chains $O^2$ and $O^7$, rods N N, stirrups N′, shaft $O^5$, pivotal arms $O^3$, and draw-bars $O^6$, substantially as shown and described, and for the purpose specified.

5. The combination of the draw-bars $O^6$, tooth-holder $O^8$, socket-arm Q, braces Q′, elliptic spring $Q^3$, and bracket $Q^4$, substantially as shown and described, and for the purpose specified.

6. The set-screw $Q^6$, block $Q^5$, and plate $Q^7$, in combination with the draw-bars $O^6$, tooth-holder $O^8$, socket-arm Q, braces Q′, elliptic spring $Q^3$, and bracket $Q^4$, substantially as shown and described, and for the purpose specified.

7. The combination of the draw-bars $O^6$, tooth-holder $O^8$, socket-arm Q, elliptic spring $Q^3$, and bracket $Q^4$ with the guide-strip $P^2$ and its support, substantially as and for the purpose set forth.

8. The regulator P′, the front upper part of which is tapered upward and forward to the center from each side, in combination with a hilling cultivator-tooth the front upper end of which is tapered upward and forward to the center and the rear lower part inclined downward to the center, substantially as shown and described, and for the purpose specified.

In testimony whereof I affix my signature in the presence of the two undersigned witnesses.

JAMES W. ROGERS.

Witnesses:
P. J. EDMUNDS,
A. EDMUNDS.